Patented May 9, 1933

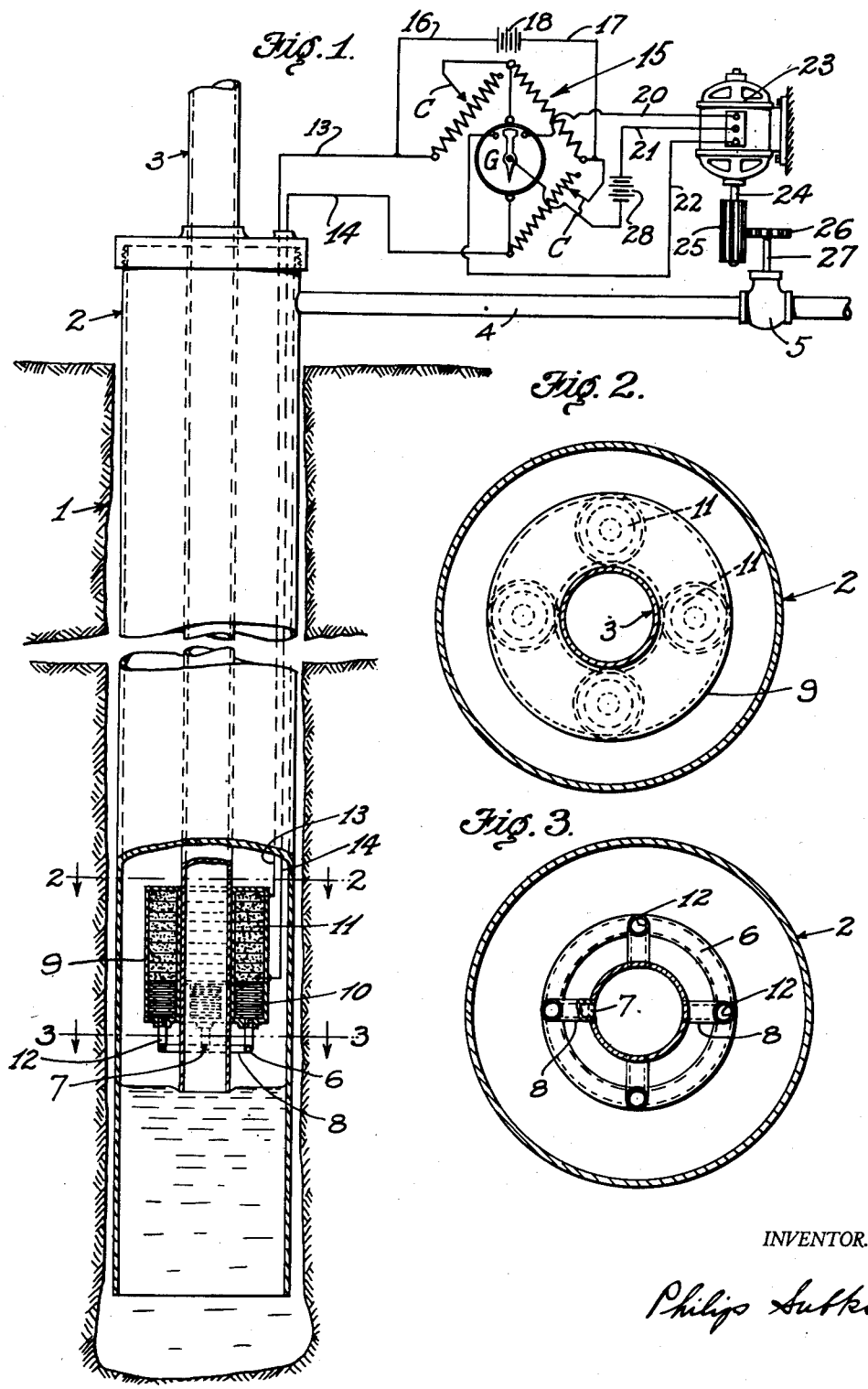

1,907,608

UNITED STATES PATENT OFFICE

PHILIP SUBKOW, OF LOS ANGELES, CALIFORNIA, ASSIGNOR TO UNION OIL COMPANY OF CALIFORNIA, OF LOS ANGELES, CALIFORNIA, A CORPORATION OF CALIFORNIA

METHOD AND APPARATUS FOR CONTROLLING GAS-LIFTS

Application filed May 26, 1930, Serial No. 455,912. Renewed April 5, 1932.

This invention relates to the so-called "gas-lift" method of flowing deep wells, particularly oil wells, and has been designed to automatically maintain a constant gas-oil ratio, that is to say a constant relation between the volume of gas used and the volume of oil discharged thereby.

Gas-lift, as now practiced, consists in passing gas under pressure into a well containing a flow tube, so that the gas passes in a stream into the flow tube adjacent its lower end, and in such passage atomizes the oil as fast as it is forced up to said tube end by the natural rock pressure in the well, the atomized oil being carried up to the surface in said gas stream. The gas may be introduced either through the flow tube or through the casing, the atomized oil being discharged from the other of the two; however, it is preferred usually to introduce the gas into the casing and discharge the oil from the flow tube. The function of the gas is to elevate the oil in the flow tube and the amount of introduced gas necessary for said elevation of the oil, irrespective of the pressure in the well, will be proportional to the weight of the column of liquid in the flow tube.

Thus, the static pressure or weight of fluid produced in the tubing of a well flowing by gas-lift will vary according to the varying proportions of gas and of oil held in said tubing, since the oil weighs more than the gas. This variation in the static head may be produced by a sudden increase or decrease in the rate of flow of oil into the casing, and from the casing into the flow tube. This change in rate will respectively cause an increase or decrease in the static head in the flow tube. The static head, assuming a constant rate of flow of oil, may also vary due to changes in the rate of gas introduction into the flow tube, since the specific weight of the mixture will change. Also, this variation in static head may be produced by the combination of the above causes, or by other causes, such as entrance of a slug of water, sand, or the like into the flow tube.

Since an increase in the static head in the flow tube means that there is more oil per unit volume of gas in said flow tube, therefore, a greater volume of gas is required to elevate this oil and to prevent the cessation of flow from the well. Inversely, since a decrease in static head means less oil in the flow tube, less gas is required to lift it, and, if gas introduction is not reduced, a waste of gas energy results when the excess goes out through the flow tube.

The maintenance of a constant ratio between the volumes of gas and oil flowing from an eduction pipe of a well is of great importance due to the economic saving in gas energy.

Therefore, the present invention has for its general object the regulation of the introduction of gas under pressure into the well casing in proportion to the rate of flow of oil into the flow tube, thus maintaining a constant gas-oil ratio in said flow tube.

Another object of the invention is to regulate the flow of gas under pressure into the well in proportion to the static head in the flow tube at each moment.

These and other objects are attained by providing means constantly responsive to the static head of the mixture of oil and gas rising in the flow or eduction tube at or near its bottom end, which means is connected to regulate automatically the introduction of gas under pressure into the well in proportion to and by means of the variations in the static head therein. It will be seen that constant and prompt regulation of the volume of gas introduced under pressure into the well in relation to the amount of oil flowing into the flow tube, will be obtained.

Briefly stated, the invention above outlined for maintaining a constant gas-oil ratio in a flow tube of a well operated by the gas-lift method broadly comprises means responsive to the static head of the mixture in the flow tube and for regulating the introduction of gas in relation or in proportion to the static head. More particularly stated, the invention comprises means responsive to the static head in the flow tube near its lower portion, and means at the surface of the ground operatively connected to said first mentioned means for regulating the introduction of high pressure gas into the well casing or gas induction pipe in proportion to the variations in said static head. The device functions independently of applied gas pressures. It is in effect a means for weighing the column of oil in the flow tube and means for introducing gas into the well in accordance with this weight. The structural phase of the invention comprises a piezometer installed on the lower portion of the flow tube, said piezometer measuring the static head in the flow tube, and transmitting the measurements, by means of sylphon bellows, a carbon pile and a control device such as a Wheatstone bridge, to a motor operating a valve on a line leading the high-pressure gas to the well casing or induction pipe. The valve thus regulates the volume of gas passing therethrough in proportion to the static head as measured by the piezometer.

The term "piezometer" or "piezometer ring" is used throughout this case to mean a device which automatically and constantly measures and transmits the static head of fluid above it in the fluid eduction pipe or tubing. In the preferred form of construction the piezometer ring is a narrow air-tight annular tube encircling the eduction pipe or tubing and opening thereinto by means of a plurality of small pipes. By the term "sylphon bellows" I mean a resilient metallic bellows expansible and contractible in response to pressure changes exerted therein. It is used herein to transmit the changes in the fluid head to the carbon pile. It will be apparent to those skilled in the art that any other pressure transmitting agency, such as a diaphragm or movable piston, may be used in its stead.

In the accompanying drawing wherein certain embodiments of the invention are disclosed by way of illustration:

Fig. 1 indicates a vertical section of a well flowed by the gas-lift method, and shows the preferred means for regulating the introduction of gas into the well in proportion to the static head in the flow tube;

Fig. 2 is an enlarged cross section on line 2—2 of Fig. 1; and

Fig. 3 is an enlarged cross section on line 3—3 of Fig. 1.

Referring to the drawing, it will be seen that the well-bore 1 is provided with a casing 2 into which a flow tube or eduction tube 3 depends. A pipe 4 which supplies gas under pressure to the casing 2 from a source, such as a compressor not shown on the drawing, is provided with a valve 5 to be actuated through the medium of a reversible motor and control now to be described. At or near the bottom of the flow tube 3 is a piezometer ring 6 opening into the flow tube at several points 7 by means of short nipples 8. An annular protecting casing 9 attached to the flow tube 3 contains a plurality of sylphon bellows 10 and a carbon pile 11. The piezometer ring 6 communicates with the interior of the sylphon bellows 10 by means of a plurality of short nipples 12. The carbon pile 11 is connected at its opposite ends to two electric conductor wires 13 and 14, which lead to a regulable control device 15 shown as a Wheatstone bridge of which the carbon pile resistance is one arm. As is usual the other resistance arms are controllable to vary their resistance as is here shown schematically by the adjustable contacts C. A battery 18 is connected to the control device 15 by means of conductor wires 16 and 17. Three electric conducting wires or lines 20, 21 and 22, respectively, lead as usual from the galvanometer G is said Wheatstone bridge 15 to a reversible motor 23. The motor shaft 24 carries as gear 25 which is in mechanical engagement with a gear 26 mounted on the stem 27 of the valve 5 carried by the gas supply pipe 4. A battery 28 placed in the line 21 supplies energy to operate the motor 23. Any other source of electrical current may of course be employed. The changes in flow of current through the carbon pile influences the galvanometer G to control the motor 23 and correspondingly actuate the gas valve 5.

The operation of the device is as follows:

In operation, all of the parts having been assembled substantially as described hereinabove for a preferred form of operation, gas under pressure is introduced into the casing tube 2 through the pipe 4. At the bottom end of the eduction or flow tube 3, the gas under pressure enters into said flow tube, is intermingled with the oil delivered to the well by the rock pressure, and the mixture of said gas and oil rises upwardly through said flow tube 3. The piezometer ring 6, by means of the short nipples or pipes 8 opening into the flow tube at 7, constantly measures the static head in the flow tube, that is to say the weight of the fluid mixture being found at any moment in said flow tube 3 above the piezometer ring 6. This measured static head or pressure is transmitted from the piezometer ring 6 through a plurality of short nipples 12 to sylphon bellows 10, which latter, tending to be expanded or collapsed respectively due to an increase or decrease in the pressure measured by the piezometer ring 6, compress the carbon pile 11 more or less, and thus respectively decrease or increase the resistance to the current passing through said carbon pile 11. The galvanometer G of the controlling Wheatstone bridge 15 will thus respond to the changes in the static head in the flow tube 3 as measured by the piezometer ring 6, and as transmitted by the variations in resistance of the carbon pile 11. These changes are in turn transmitted by the control device 15 to the reversible motor 23, which latter, by means of gears 25 and 26, tends to open and close the valve 5 on the line 4 in proportion to the increase or decrease, respectively, in the static head in the flow tube 3, as measured by the piezometer ring 6 and as transmitted in the form of changes produced in current flow by the varying resistance of the carbon pile 11.

In initiating the automatic operation of a control device of the present type in a well flowing by the gas-lift method, a proper gas-oil ratio is first obtained in the eduction or flow tube 3 by a manual regulation of the valve 5 to control the introduction of gas into the well. The corresponding static head of the fluid mixture in said tube 3 will be then measured by the piezometer ring 6, and this head will be transmitted by said piezometer ring to the sylphon bellows 10 to compress the carbon pile 11 and thus create a definite resistance in the electric circuit. Then the regulable resistances in the different branches of the Wheatstone bridge will be so adjusted that the needle of the galvanometer G will stand in its neutral position when the desired gas-oil ratio exists. If an excess slug of oil enters into the flow tube 3, this will immediately increase the static head measured by the piezometer ring 6, thus expanding the sylphon bellows 10 and compressing the carbon pile 11. This compression of pile 11 will decrease the electric resistance therethrough, which decrease in resistance will immediately effect the galvanometer G so that the latter will actuate motor 23 and gear assembly 25 and 26, thus tending to further open the valve 5 on line 4 leading gas under pressure into the casing 2. The increased quantity of gas under pressure thus introduced into the casing will pass into the flow tube 3 at its bottom, aid in the eduction of the excess quantity of oil therein and thus reduce the static head in the flow tube 3 and restore the gas-oil-ratio in said tube to the desired value. If the static head in the flow tube 3 decreases for any reason, such as a decrease in the rate of inflow of oil into the well, the decrease in static head as measured by the piezometer ring 6 collapses the sylphon bellows 10, increases the electric resistance through the carbon pile 11, and causes the control device 15 to actuate the reversible motor 23 to close proportionally the valve 5, thus decreasing the amount of gas introduced into the casing 2. The pinching down on the gas supply will continue until the predetermined desired gas-oil ratio is again obtained.

From the foregoing, it will be obvious that the device tends to maintain a constant gas-oil ratio in the flow tube, that the changes in the gas-oil ratio in said flow tube are caused to vary immediately the amount or rate of introduction of gas under pressure into the well, and that the device is responsive even to small changes of gas-oil ratio as measured by the piezometer ring. It will be further obvious that, after the first manual regulation of the volume of gas supplied to the well, the device will continue automatically to regulate said gas flow, thus making it unnecessary to watch the well constantly to prevent the cessation of flow of oil therefrom, or a waste of the gas introduced thereinto. It will be observed that the operation is independent of applied gas pressures and functions independently of the pressure in line 4 and casing 2 and depends only on the pressure or head in tubing 3.

The above disclosures are to be considered not as limiting but merely illustrative, and many variations which will be apparent to those skilled in the art may be made within the scope of the following claims. For example the controlling device could be made to regulate the discharge of oil into the flow tube in accordance with static head changes rather than to regulate the supply of gas to the well in accordance with such changes.

I claim:

1. In a method for maintaining a constant gas-oil ratio in a fluid eduction pipe through which oil is elevated by gas-lift, the step of automatically varying the supply of gas substantially continuously in accordance with variations in static head in the eduction pipe to maintain constant gas-oil ratio.

2. In a method for maintaining a constant gas-oil ratio in a fluid eduction pipe through which oil is elevated by gas-lift, the step of automatically varying the supply of gas to the pipe independently of the gas pressure to increase the gas supply as static head in the pipe increases and to decrease said gas supply as the static head decreases.

3. A gas-lift method comprising supplying the gas to a well and into the lower end of a fluid eduction tube whereby liquid in the well is elevated through said tube, and varying the rate of supply of gas to the eduction tube through the influences of variations in static pressure in the tube.

4. In a method for maintaining a constant gas-oil ratio in a fluid eduction pipe in which oil is lifted by gas-lift, the step of varying the rate of flow of gas into a gas induction pipe in accordance with the variations in static pressure in the fluid eduction pipe.

5. In a method for maintaining a constant gas-oil ratio of the fluid being discharged from a well through a well tubing by gas-lift, the step of varying the rate of flow of gas into the well in proportion to the variations in static pressure in said tubing.

6. In combination with a gas induction pipe and a fluid eduction pipe communicating with each other, means associated with said fluid eduction pipe responsive to the static pressure therein and independent of the pressure in the gas induction pipe, and means operatively connected with the first mentioned means to regulate the inflow of high pressure gas in proportion to the static head in the eduction pipe.

7. In combination with a gas induction pipe and a fluid eduction pipe communicating with each other, a piezometer ring associated with said fluid eduction pipe and responsive to the static pressure therein, and means operatively conected with the piezometer ring to regulate the inflow of high pressure gas in response to the static head in the eduction pipe.

8. In combination with a gas induction pipe and a fluid eduction pipe communicating with each other, means associated with said fluid eduction pipe responsive to the static head pressure therein and independent of the pressure in the gas induction pipe, and means operatively connected with the first mentioned means to regulate the inflow of gas into the gas induction pipe in proportion to the static pressure in the fluid eduction pipe.

9. In combination with a well casing and a tubing communicating with each other and to which gas under pressure is supplied, means connected with said tubing responsive to the static head pressure therein and independent of the pressure in the casing, and means operatively associated with the first mentioned means to regulate the inflow of high pressure gas in proportion to the fluctuations in the static pressure in the tubing.

10. In a combination according to claim 9, wherein the means connected with the tubing and responsive to the static head pressure therein is a piezometer.

11. In combination with a well casing and a tubing into which gas under pressure is introduced, means attached to the lower portion of said tubing responsive to the static head in said tubing and independent of the pressure in the gas induction tubing, and means operatively attached to the first mentioned means to regulate the inflow of high pressure gas continuously in proportion to fluctuations in the static head in the tubing.

12. In combination with a well casing into which a tubing depends and into which gas under pressure is introduced from a source, a valve on said source, means attached to the lower portion of said tubing responsive to the variations in the weight of the fluid in said tubing and independent of the pressure in the gas induction tubing, means to operate said valve, and means operatively connected to said weight responsive means for regulating said valve operative means to thus regulate the introduction of gas from the source in proportion to the variations in the weight of fluid in the tubing.

13. In combination with a well casing into which a tubing depends and into which gas under pressure is introduced from a source, a valve on said source, a piezometer ring within the well casing for transmitting the static head of the fluid at substantially the bottom of the tubing, means operatively attached to said piezometer and responsive to said static head, and means in engagement with the first mentioned means and the valve to actuate said valve and thus regulate the introduction of gas from the source in proportion to the static head transmitted by the piezometer ring.

14. In combination with a well casing into which a tubing depends and into which gas under pressure is introduced from a source, a valve on said source, a piezometer ring within the well casing for transmitting the static head of the fluid at substantially the bottom of the tubing, a sylphon bellows communicating with said piezometer ring, electric means operatively attached to said sylphon bellows and responsive to said static head and means in engagement with the first mentioned means and the valve to actuate said valve and thus regulate the introduction of gas from the source in proportion to the static head transmitted by the piezometer ring.

15. In a combination according to claim 14, wherein a carbon pile is placed in series with the electric means responsive to the static head to thus change the resistance in the circuit in proportion to the changes in said static head.

16. In a device responsive to the static head within a flow pipe, a piezometer ring opening into said pipe, an electric resistance operatively associated with said ring, means to vary said resistance in accordance with the pressure in the piezometer ring, and means operatively associated with said resistance and operable in response thereto.

17. In a device responsive to the static pressure within a flow pipe, a piezometer ring communicating with said pipe, a sylphon bellows connected to the piezometer ring and operable by the pressure transmitted thereby, an electrical resistance operatively connected to said sylphon bellows to vary said elctrical resistance in accordance with the pressure in the piezometer ring, and means operatively connected with said electrical resistance and responsive thereto.

18. In a device responsive to the static pressure within a flow pipe, a piezometer ring communicating with said pipe, a sylphon bellows connected to the piezometer ring and operable by the pressure transmitted thereby, an electrical resistance operatively connected to said sylphon bellows said electrical resistance thus varying in accordance with the pressure in the piezometer ring, and a Wheatstone bridge operatively connected with said electric resistance and responsive thereto.

19. A well flowing device comprising a fluid flow tube and a gas induction tube to supply gas to the flow tube, a device near the lower end of the flow tube sensitive to changes in static head, a variable electric resistance element connected with said sensitive device, a Wheatstone bridge connected with said variable resistance and responsive to changes in said resistance, a reversible motor governed by said bridge, means to supply gas to the gas induction tube, a regulating valve in said gas supplying means, and a connection between said motor and said valve for automatic adjustment of the valve.

20. A well flowing device comprising a gas induction tube leading to a source of liquid supply, a fluid eduction tube leading from said supply, means connected with said eduction tube sensitive to changes in static pressure within said eduction tube, and means controlled by said pressure sensitive device to regulate and maintain substantially constant the gas-oil ratio of the fluid passing through said eduction tube independently of variations of gas pressure in the gas induction tube.

21. A gas lift method for recovering a liquid from a well comprising applying gas to an eduction tube having communication with a liquid supply for elevation of liquid through the tube, and substantially continuously regulating the gas-oil ratio of the fluid flowing through the tube in accordance with changes in the static head in said tube independent of applied gas pressure.

22. In combination with a well pipe, a device associated therewith and adapted to respond to static pressure within the well, said device comprising a piezometer open to the well pressure, an electric resistance operatively associated with the piezometer and adapted to have its resistance varied by said pressure, an electric circuit operatively connected with said resistance, and a galvanometer positioned in said circuit and adapted to respond to variations in resistance.

23. A device positioned in the lower portion of a well hole comprising means responsive to the static pressure in said hole, and operable against a pressure independent of the pressure in the hole, electric means associated with said pressure-responsive means and operable thereby, an electric circuit operably connected with said electric means, said electric circuit including means responsive to said electric means and operable in proportion to changes produced in said electric means by said pressure responsive means.

24. A structure according to claim 23 wherein the means in the electric circuit includes a Wheatstone bridge.

25. A structure according to claim 23 including means controlled by the means operatively connected to said electric circuit, for introducing gas into the well in response to pressure variations in the lower portion of the well.

26. In a device responsive to the static head within a flow pipe, a piezometer opening into said pipe, an electric resistance operatively associated with said piezometer, means to vary said resistance solely in accordance with the pressure in the piezometer, and means operatively associated with said resistance and actuable solely in response to said resistance.

27. In combination with a pipe depending into a well, a device associated with said pipe and adapted to respond to static pressure within the well, comprising a piezometer open to said well pressure, an electric resistance operatively associated with the piezometer and connected to have its resistance varied solely by the pressure within the piezometer, and means operatively associated with said resistance and actuable solely in response to variations in said resistance.

28. In combination with a well pipe, a device associated therewith and adapted to respond to static pressure within the well, said device comprising a piezometer open to the well pressure, an electric resistance operatively associated with the piezometer and adapted to have its resistance varied solely by the pressure within the piezometer, an electric circuit operatively connected with said resistance, and a galvanometer positioned in said circuit and adapted to respond solely to variations in said resistance.

29. In combination with a pipe depending into a well, a device associated with the lower portion of said pipe, comprising means responsive to the static pressure in the well and operable against a pressure independent of the well pressure, electric means associated with said pressure-responsive means and operable thereby, an electric circuit operably connected with said electric means, said electric circuit including means responsive to said electric means and operable in proportion to changes produced in said electric means by said pressure-responsive means.

Signed at Los Angeles, in the county of Los Angeles, and State of California, this 15 day of May A. D. 1930.

PHILIP SUBKOW.

CERTIFICATE OF CORRECTION.

Patent No. 1,907,608.  May 9, 1933.

PHILIP SUBKOW.

It is hereby certified that error appears in the printed specification of the above numbered patent requiring correction as follows: Page 2, line 81, for "is" read "in"; page 4, lines 40 and 52, claims 11 and 12, respectively, for "gas induction tubing" read "casing"; and that the said Letters Patent should be read with these corrections therein that the same may conform to the record of the case in the Patent Office.

Signed and sealed this 29th day of August, A. D. 1933.

M. J. Moore.

(Seal)  Acting Commissioner of Patents.